Patented Apr. 23, 1929.

1,710,019

UNITED STATES PATENT OFFICE.

LEONHARD DEUTSCH AND ISAK THORN, OF VIENNA, AUSTRIA, ASSIGNORS TO THE SELDEN COMPANY, OF PITTSBURGH, PENNSYLVANIA, A CORPORATION OF DELAWARE.

PROCESS OF PRODUCING TRANSPARENT, HARD, INSOLUBLE, AND INFUSIBLE PRODUCTS OF CONDENSATION FROM PHENOLS AND ALDEHYDES.

No Drawing. Application filed September 15, 1923, Serial No. 662,998, and in Yugoslavia September 28, 1922.

It is well known that the condensation of phenols and aldehydes into hard, insoluble and infusible products is carried out gradually and by degrees or steps. The solvent power of the condensation product is diminished in accordance with its increasing insolubility, so that foreign matters, particularly water, which during the individual stages of the reaction are in solution, will be separated in a condition causing turbidity during the progress of the condensation reaction. Also products which are quite free from water contain such matters in a turbid state after having become solid. This is caused by the fact that the conversion is not large enough during any stage of reaction, not even if employing larger quantities of the condensing agents (alkalies or acids). Thus the product of reaction always contains a considerable part of the original components in a free state or at least in a state which is still capable of reaction, and also during the later stages of condensation the reaction will still be accompanied by a separation of water.

However such subsequent reactions may be avoided or reduced in case one of the two components is present in excess, but it is not desirable that an unaltered or unchanged original component be present in the final product. In view of this the reaction product has to be freed from the original components which are still capable of reaction before distilling off the water, by a careful washing-out or extraction. In this manner transparent and hard products are obtained, and at present such methods are generally used.

However such processes are expensive and troublesome, and the yields therefrom are small, because a considerable part of the soluble condensation product is removed from the reaction product with the unchanged original components. Therefore the experiment has been made to avoid the methods of cleaning by adding hygroscopic substances to the product after the water has been distilled off in order to bind the water of reaction produced during the hardening. Transparent products may be obtained in this manner, but hitherto such methods have not been found satisfactory owing to undesirable secondary actions. There are two groups of admixtures acting in this manner, to the one group belong organic solvents, particularly alcohols, and to the other group caustic alkalies and alkali carbonates. However when adding the quantities of organic solvents which are necessary for combining with the water, the mechanical properties of the products, namely hardness and solidity will suffer, while the alkalis cause a considerable darkening of the products in a very short time.

The characteristic feature of the present invention consists in the employment of a group of new hygroscopic substances, comprising the alkali salts of the aromatic carboxylic acids, which compared with the known groups possess none of the drawbacks of the latter. Such additions are even capable of binding far greater quantities of water than those separated during the subsequent reaction, and even components which are insoluble in water or in the condensation product such as cyclic carbohydrates, monovalent or poly-valent alcohols, abietic acid, rosin and so forth, result in solid, transparent solutions with the condensation product if these salts and their derivatives are present. The products obtained in this simple manner, whether with such additional components or without them, are of the same mechanical properties and fast colors as those cleaned by washing or the like.

In carrying out the invention the condensation either is performed with small quantities of caustic alkalies or their carbonates and thereafter the suitable quantities of these alkaline salts are added, or in order to accelerate the condensation larger quantities of alkalies are employed and subsequently they are transformed to those salts by the aromatic carbonic acids. In order to increase the color-fastness of the final product it is of advantage to make use of a surplus of the carbonic acids.

*Example 1.*

1 kilogram of phenol and 1 kilogram of formaldehyde, say in the form of a 40% solution, are brought to reaction with 2 grammes of sodium carbonate, subsequently 50 grammes of sodium benzoate and 50 grammes of sodium salicylate are added, now the water is expelled; however it is not necessary to expel the whole of the water, and finally the residue of distillation is hardened in known manner.

*Example 2.*

1 kilogram of phenol and 1 kilogram of formaldehyde of 40% are condensed with 20 to 40 grammes of sodium carbonate, subsequently 60 to 120 grammes of benzoic acid are added, and finally the water is expelled and hardened as above described.

We claim:

1. A process of producing transparent, hard infusible condensation products which comprises subjecting phenols and aldehydes, capable of forming resins which can be hardened by heat, to condensation in the presence of a non-volatile alkali, volatilizing free water and subsequently adding to the product a compound containing an aromatic carboxylic acid radical and then hardening the product by heat.

2. A process of producing transparent, hard, infusible condensation products which comprises subjecting phenols and aldehydes, capable of forming resins which can be hardened by heat, to condensation in the presence of an alkali, volatilizing free water and subsequently adding to the product a compound containing an alkali metal salt of aromatic carboxylic acid and then hardening the product by heat.

3. A process according to claim 2 in which the aldehyde is formaldehyde.

4. A process of producing transparent, hard, infusible condensation products, which comprises subjecting phenols and aldehydes capable of forming resins, which can be hardened by heat, to condensation in the presence of a non-volatile alkali, volatilizing free water formed, adding to the product a compound containing a benzoic acid radical and then hardening the product by heat.

5. A process of producing transparent, hard, infusible condensation products, which comprises subjecting phenols and aldehydes capable of forming resins, which can be hardened by heat, to condensation in the presence of an alkali, volatilizing free water formed, adding to the product an alkali metal benzoate and then hardening the product by heat.

In testimony whereof we affix our signatures.

Dr. LEONHARD DEUTSCH.
Ing. ISAK THORN.